United States Patent

Wiley, Carl A.

[15] 3,646,559
[45] Feb. 29, 1972

[54] PHASE AND FREQUENCY SCANNED ANTENNA

[72] Inventor: Wiley, Carl A., Corona Del Mar, Calif.
[73] Assignee: North American Rockwell Corporation
[22] Filed: Jan. 15, 1968
[21] Appl. No.: 699,756

[52] U.S. Cl. ........................ 343/100 SA, 343/854, 343/858
[51] Int. Cl. ........................................................ H01q 3/26
[58] Field of Search ............................ 343/100.6, 854, 858

[56] References Cited

UNITED STATES PATENTS

| | | | |
|---|---|---|---|
| 3,083,360 | 3/1963 | Welty et al. | 343/100.6 X |
| 3,213,454 | 10/1965 | Ringenbach | 343/100.6 X |
| 3,286,260 | 11/1966 | Howard | 343/100.6 |

*Primary Examiner*—Richard A. Farley
*Assistant Examiner*—Richard E. Berger
*Attorney*—William R. Lane, L. Lee Humphries and Rolf M. Pitts

[57] ABSTRACT

A multimode antenna for simultaneously providing at least one frequency-scanned mode and a phase-scanned mode. The isolated ports of the directionally coupled radiating apertures of a cross-fed frequency-scanned array, are adapted to be fed from a fixed frequency source by a phased array of voltage-controlled phase shifters or by mechanically scanned means for adjusting the phase gradient (or by a combination of the two). The fixed frequency corresponds to a direction-frequency (of the frequency-scanned array) outside the range of directions to be covered by the phased array, thereby providing mutual isolation between the phased-array energy and the frequency-scanned energy.

9 Claims, 5 Drawing Figures

INVENTOR.
CARL A. WILEY

INVENTOR.
CARL A. WILEY

BY

ATTORNEY 3,646,559

PHASE AND FREQUENCY SCANNED ANTENNA

CROSS-REFERENCES TO RELATED APPLICATIONS

1. U.S. application Ser. No. 472,236 filed July 15, 1965, now U.S. Pat. No. 3,434,139, by J. A. Algeo for Frequency Controlled Scanning Monopulse Antenna.
2. U.S. application Ser. No. 621,007 filed Mar. 6, 1967, now U.S. Pat. No. 3,518,689, by J. A. Algeo, et al., for Frequency-Sensitive Cross-Scanning Antenna.
3. U.S. application Ser. No. 649,166 filed June 27, 1967, now U.S. Pat. No. 3,518,576, by J. A. Algeo for A Crossed Guide Directional Coupler.

BACKGROUND OF THE INVENTION

Frequently, in the utilization of radar equipment in a military airborne application it is desirable to perform a number of functions, such as air-to-air search for and tracking of airborne targets and, in certain armament situations, the illumination of a target for cooperation with a guided air-to-air missile employing a tracking receiver responsive to energy received from such illuminated target. In the conventional design of air-to-air guided missile weapon systems, a radar transmitter aboard the launching aircraft (or mother ship) is employed to illuminate the target which is then angle-tracked by a missile launched from the mother ship. A monopulse receiver or other angle-tracking means installed in the missile provides angle-tracking signals for flightpath control of the missile, as is understood in the art.

The performance of such multifunctions by airborne equipment is subject to a number of mutually conflicting design constraints. The volume and weight and power limitations imposed upon such equipment are in conflict with the use of separate equipments for providing each of the several system functions desired. The use of separate antennas for such functions is subject to the conflicting requirements of limited space to accommodate such antennas versus the need for the largest aperture available to reduce beamwidth and system power requirements while meeting specified maximum range performance requirements.

Accordingly, it is desirable to provide a single antenna capable of performing several modes independently and concomitantly. For scanning modes, an electronically scanned array is preferable to mechanically scanning devices, because a maximum aperture may be employed without suffering the reduced speed of response due to the increased inertias associated with such maximum apertures. A dual mode electronically scanning array, employing frequency scanning, is described in copending application Ser. No. 621,007 filed Mar. 6, 1967, and owned by North American Rockwell Corporation, assignee of the subject application; while a cross-guide directional coupler, useful for implementing such a multimode frequency scanning array, is described in copending U.S. application Ser. No. 649,166, filed June 27, 1967, and owned by North American Rockwell Corporation, assignee of the subject invention. The utilization of such frequency scanning arrays in a monopulse or angle-tracking application is described in copending U.S. application Ser. No. 472,236 filed July 15, 1965, and owned by North American Rockwell Corporation.

Although the concept of using the single aperture provided by a frequency-scanned array to provide several independent frequency scanned modes is known, such concept does not comprehend the integration of a frequency scanned mode and a fixed frequency phase-scanned mode. Such combination of modes is of significance in the integration of a frequency-scanned system search mode and a fixed frequency carrier illumination mode for illumination of a target in cooperation with an air-to-air missile having a fixed-frequency tracking receiver and launched from an aircraft serving as a radar platform for the target illuminator. An ancillary requirement for such a multimode scanning antenna is that mutual coupling and interference between the several modes thereof be reduced to negligible levels.

SUMMARY OF THE INVENTION

By means of the concept of the subject invention, a multimode antenna array is employed, for providing a frequency-scanned mode and a phase-scanned mode, said modes being propagated independently of one another.

In a preferred embodiment of the subject invention, there is provided a planar matrix or array of cross-fed radiating elements, and including first feed means comprising frequency-scanning directional feed means in cross-fed cooperation with the array for providing a preselectively linearly polarized first scan mode of operation within a limited bandwidth. There is also provided a selectively phase-controlled feed means in cross-fed cooperation with the array for providing a second scanned mode of operation outside the bandwidth of, and independently of the first mode.

By means of the mutually exclusive bandwidths, directional feeds and mutually orthogonal polarizations employed by the two modes, mutual coupling and interference are avoided and independence of mode operation is achieved. Therefore, a single array having a maximum size aperture may be commonly employed for both modes. Accordingly, an object of the invention is to provide an efficient multimode scanning antenna.

It is another object of the invention to provide a multimode scanning array having mutually independent frequency-scanning and phase-scanning modes.

It is still another object to provide a cross-fed array having bandwidth and polarization isolation between a frequency-scanned mode and a phase-scanned mode thereof.

These and further objects will become apparent from the following description, taken together with the accompanying drawings, in which:

BRIEF DESCRIPTION OF THE DRAWINGS

In the figures, like reference characters refer to like parts.

Referring now to FIG. 1, there is illustrated a perspective view, partially torn away, of an array embodying an aspect of the inventive concept. There is provided an array of radiating main guides 10, each including a forward section 11 having a rectangular cross section, an aft section 12 having a square cross section, and a stepped intermediate section 13. Associated with each column of main guides is at least one or a first pair 14a and 14b of crossed feed guides directionally coupled to forward section 11 of each mainguide 10 for propagating a preselectively polarized first mode between a selected terminal set of feedguide pair 14a and 14b and a forward port 15 of such mainguide 10, as shown more particularly in FIGS. 2 and 3.

Figure 4:
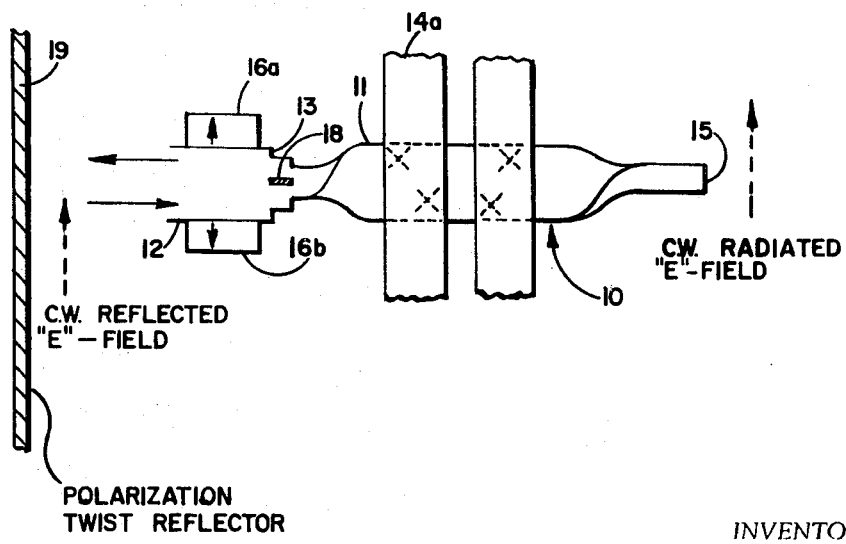

Associated with each row of mainguides is a second pair of crossed feedguides 16a and 16b directionally coupled to aft section 12 of each mainguide 10 for propagating a preselectively polarized second mode between a terminal set of second pair 16a and 16b and an aft port 17 of mainguide 10, as shown more particularly in FIG. 4.

The arrangement of coupling apertures in conjunction with crossed guides to effect preselected directional coupling of preselected polarization modes is known in the art, being described for example in copending U.S. application Ser. No. 649,166 for A CROSSED GUIDE DIRECTIONAL COUPLER, filed June 27, 1967, by J. A. Algeo, assignee to North American Aviation, Inc., whose name has been subsequently changed to North American Rockwell Corporation, assignee of the subject invention.

There is further provided polarization-rotating reflective means such as a twist reflector 19 located aft of ports 17 of mainguides 10 for reflection of the directionally aft coupled second mode (propagation through aft port 17) and rotation of the polarization thereof, and also for cooperation with impedance 18 for loading the nondirective (backfire) component of the first mode. A description of the construction, arrangement and cooperation of such a polarization-rotating reflector may be found in U.S. Pat. No. 2,736,895 issued Feb. 18, 1956, to C. A. Cochrane for High Radio Aerials. Because the reflection from element 19 is cross-polarized relative to an incident mode, the polarization-sensitive shunt impedance means 18 within transition section 13 is relatively nonresponsive to the reflected and polarization-rotated second mode.

By generating the oppositely-directional first and second modes of mutually crossed polarizations (as referred to a common plane within the mainguide 10), polarization-sensitive shunt impedance means 18 (mounted in transition section 13) may be employed for attenuating (nondirective modes of) propagation from first feedguide pair 14a and 14b and from second feedguide pair 16a and 16b as to assure mode isolation therebetween, as will be more fully explained hereinafter. Because of the mutual perpendicularity between first feedpair 14a and 14b and second feedpair 16a and 16b, for economy of space and arrangement, such mode polarization may be more conveniently effected by inclusion of a 90° twist in forward section 11 between feedpair 14a and 14b and transition section 13.

Figure 3:
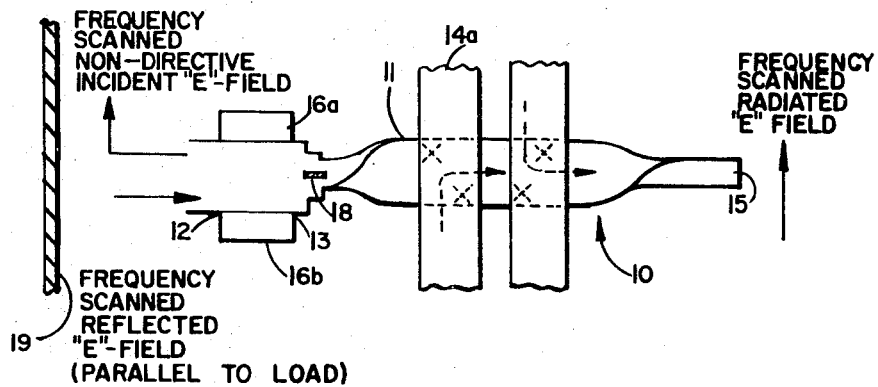
FIGS. 3 and 4 are schematic side views of the arrangement of FIG. 2, showing the propagation paths of a respective one of two mutually independent propagation modes.

The polarization of the generated second mode is selected such that the nondirectional component thereof is directly attenuated by polarization sensitive load impedance 18. The nondirectional component of the cross-polarized first mode is propagate past attenuator 18 to reflector 19, and is there cross-polarized (so as to have a polarization plane parallel to that of the generated second mode) and is reflected. Attenuator 18 then attenuates such cross-polarized, reflected backfire component of the first mode, while the directionally coupled component of the polarized first mode is radiated from port 15, as shown in FIG. 3.

Figure 1:
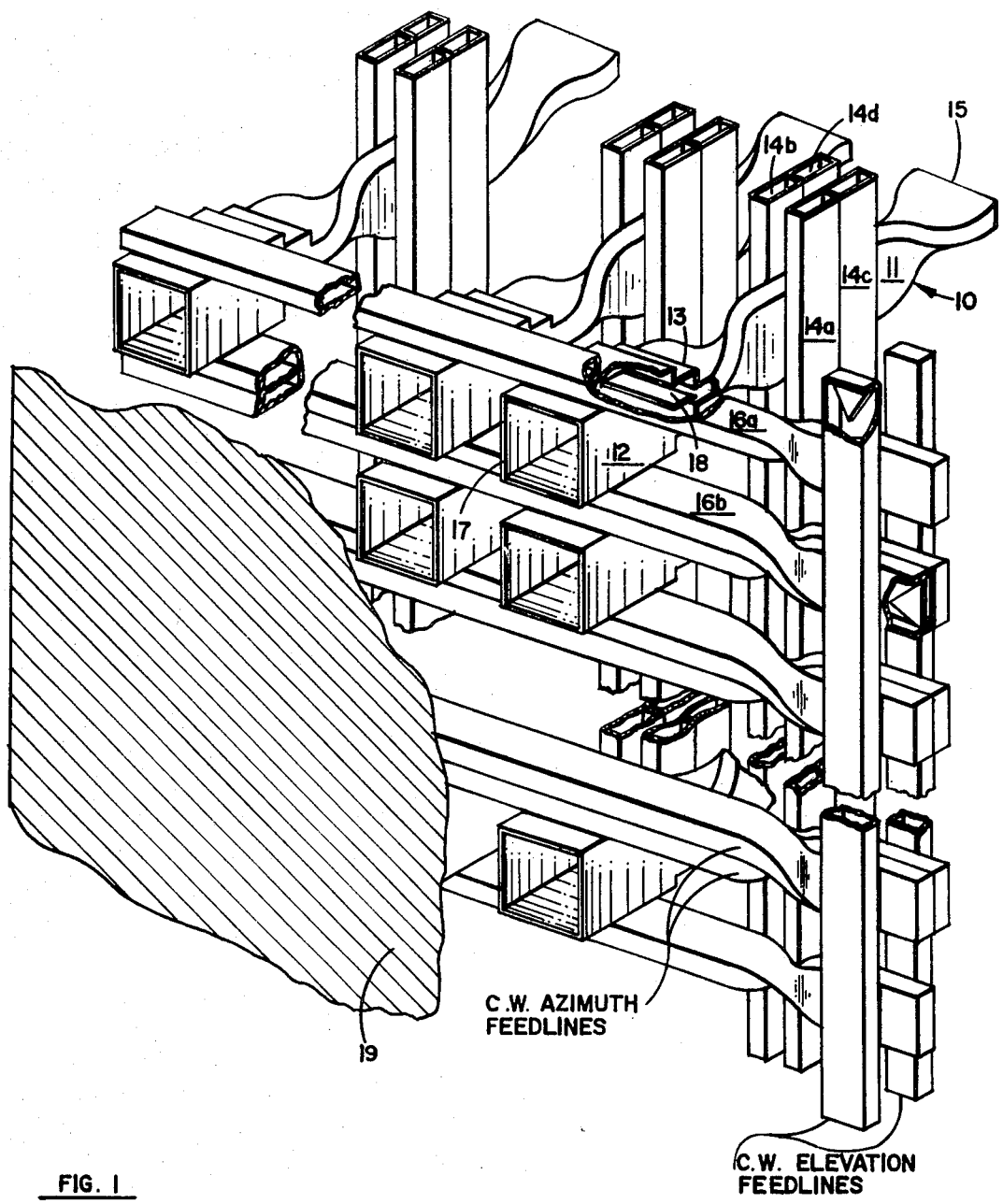
FIG. 1 is a perspective view, partially torn away, of an array embodying an aspect of the inventive concept.
Figure 2:
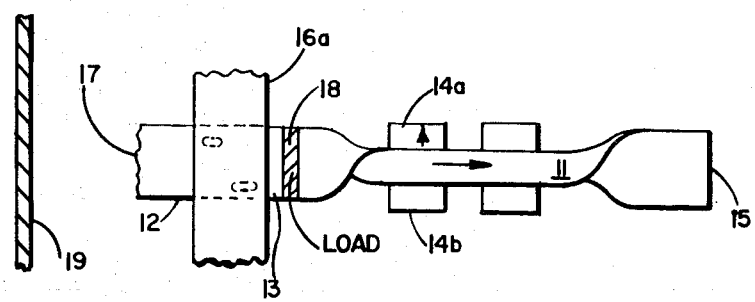
FIG. 2 is a schematic plan view of a main guide 10 and crossed feed guides 14a, 14b and 16a of FIG. 1.
Figure 5:
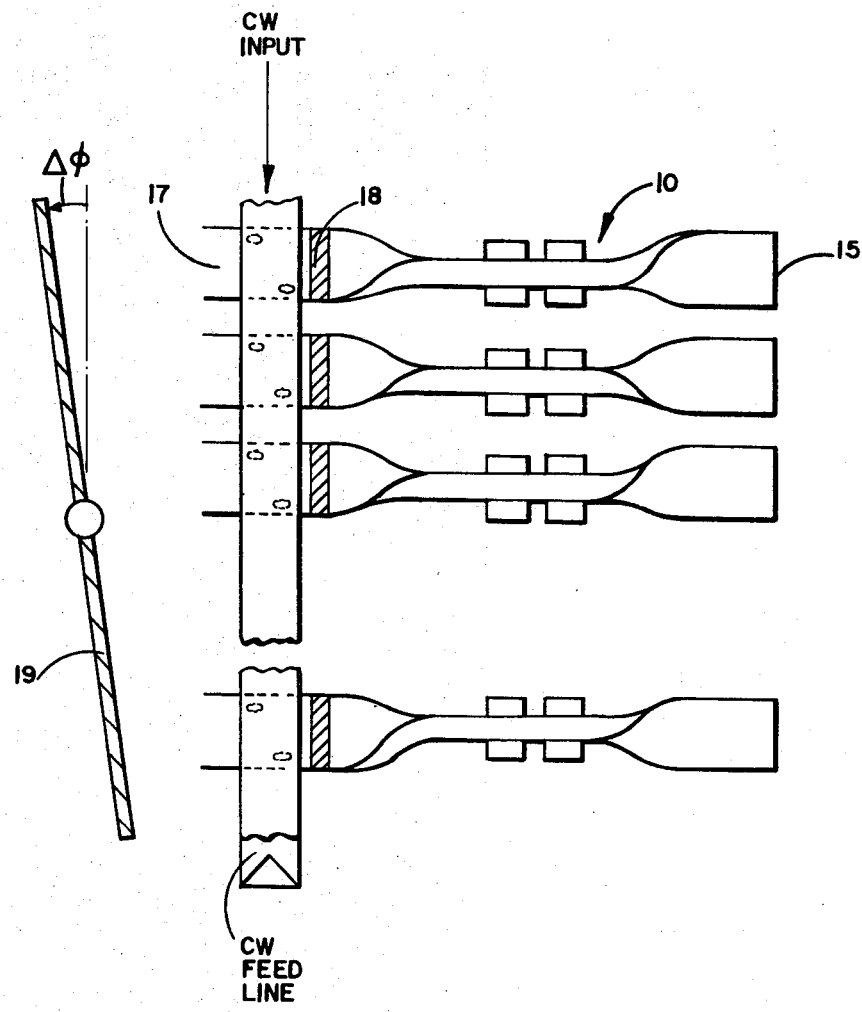
FIG. 5 is a plan view of a horizontal stack of the schematic crossfeed arrangement of FIG. 2.

The cross-polarized reflection of the directionally aft coupled second mode, which is reflected from element 19 past impedance 18, may be observed (at port 15) to be polarized in the same plane as the directionally coupled component of the first mode. Hence, both the first and second radiated modes are radiated from front port 15 of each of mainguides 10 in a common plane of polarization.

Where the vertical first feed pairs are connected to a frequency-scanned RF power source through a tapped helical line, a dual-plane frequency-scanning beam is provided by the cooperation of said first modes of said mainguides 10, as described in copending U.S. application Ser. No. 472,236 for Frequency-Sensitive Cross-Scanning Antenna, filed July 15, 1965, by J. A. Algeo, assignee to North American Aviation, Inc., whose name has been subsequently changed to North American Rockwell Corporation, assignee of the subject invention.

Where the angular orientation of the plane of the reflector 19 is selectively controlled or varied, relative to the planar array of ports 17 (as showed in FIG. 5), then the phase-front of the energy propagated by cooperation of the reflected, cross-polarized second modes of mainguides 10, is correspondingly adjusted, providing a second directionally scanned beam. In other words, the columns of feed pairs 14a and 14b (in FIG. 1) cooperate with the rows of mainguides 10 to comprise frequency-scanning directionally feed means in cross-fed of the crossed feeds) of for providing a first scanned mode of operation; and main guides 10 cooperate with the rows of feed pairs 16a and 16b and reflector 19 to comprise selectively phase-controlled feed means in cross-fed cooperation for providing a second scanned mode independently of the first scanned mode. Mutual interference between the two modes is reduced by the oppositely directional coupling and mutually crossed polarization of each generated mode relative to the other (as seen in transition section 13) and the cooperation of the polarization-sensitive attenuator 18 (in the transition section 13 of each main guide 10) with the directional couplers of the cross feeds) of such main guide 10. A further degree of isolation is provided in that there is little likelihood that any interfering mode components from each main guide 10 when combined in the feedline of a mode of interest will coherently combine so as to provide a substantial interference or cumulative cross-talk effect. Still further isolation between modes may be effected by the use of a second mode wavelength lying outside the bandwidth employed for the first frequency-scanned mode.

Such bandwidth isolation may be more conveniently obtained by reducing the required bandwidth for the frequency-scanned mode. Such reduced bandwidth of the frequency-scanned mode may be achieved at the expense of an added directionally coupled crossed feed 14c and 14d for each column of mainguides 10 and waveguide means for switching between crossfeed means 14a and 14b and crossfeed means 14c and 14d in synchronism with the frequency-scan cycle. That same bandwidth for scanning one feed set (14a and 14b) from broadside to one endfire direction (in the low dispersion plane) may alternatively be used to scan the second feedset (14c and 14d) from broadside to an opposite end fire state. Thus, the required bandwidth for the frequency-scanned mode may be halved.

Although the phase-scanned mode has been illustrated and described in terms of a mechanically scanned cross-polarizing reflector, the concept of the invention is not so limited, and electronically phase-scanned arrays are contemplated. In other words, nonscanning cross-polarizing reflective means may be employed in conjunction with a matrix of phase shifters, a phase shifter interposed in the aft section 12 of each main guide 10, whereby the scanning speed limitation imposed by the inertia of a mechanical system is avoided. The selectively controlled excitation of a matrix of voltage-controlled microwave phase shifters, such as ferrite phase shifters, to effect scanning of a microwave radiating array is well known in the art, being described for example at pages 312–313 and illustrated in FIGS. 7.46 and 7.47 of *Introduction to Radar Systems* by Skolnik, published by McGraw-Hill Company (1962).

Accordingly means has been described for employing a single common array or aperture to provide a frequency-scanned first mode of operation within a limited bandwidth and a phase-scanned fixed frequency second mode outside the bandwidth of the first mode, the two modes being generated and scanned independently of each other. Therefore, an improved multimode array has been disclosed.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A multimode scanning antenna including an array and comprising
   frequency-scanning directional feed means in cross-fed cooperation with such array for providing first scanned mode of operation within a limited bandwidth; and
   selectively phase-controlled feed means in cross-fed cooperation with said array for providing a second scanned mode of operation outside the bandwidth and independently of said first mode.

2. The device of claim 1 in which said phase-controlled feed means comprises
   directional coupler means aft of said frequency-scanning directional feed means for providing a preselectively directionally coupled energy mode in said array in a backfire direction relative to both the location of said frequency-scanning directional coupler means and the propagation direction of said directionally coupled first mode; and
   mechanically orientable microwave reflective means located aft of said array for reflecting said energy mode through said array with a selectively adjusted phase front.

3. A multimode scanning antenna array comprising frequency-scanning directional feed means in cross-fed cooperation with such array for providing a preselectively linearly polarized first scanned mode of operation within a limited bandwidth; and selectively phase-controlled feed means in cross-fed cooperation with said array for providing a second scanned mode of operation like polarized relative to, outside the bandwidth of and independently of said first mode.

4. The device of claim 3 in which said phase-controlled feed means comprises directional coupler means aft of said frequency-scanning directional feed means for providing a preselectively directionally coupled energy mode in said array in a backfire directional relative to both the location of said frequency-scanning directional coupler means and the propagation direction of said directionally coupled first mode; and mechanically orientable cross-polarizing microwave reflective means located aft of said array for reflecting said energy mode through said array with a selectively adjusted phase front and cross polarization.

5. Multimode crossed feed microwave means comprising a main guide including a forward section having a rectangular cross section, an aft section having a square cross section and a stepped transition section intermediate said forward and aft sections, a first pair of crossed feedguides directionally coupled to said forward secton for propagation a preselectively polarized first mode between a selected terminal set of said first pair and a forward port of said main guide, a second pair of crossed feed guides directionally coupled to said aft section of said main guide for propagating a preselectively polarized second mode between a terminal set of said second pair and an aft port of said main guide, shunt impedance means mounted in said transition section for attenuating nondirective propagation from said first feed guide pair and from said second feed guide pair, polarization rotating reflective means aft of said aft port of said main guide for reflection of said second mode and rotation of the polarization thereof, said shunt impedance means being relatively nonresponsive to such reflected and polarization-rotated second mode.

6. The device of claim 5 in which said rotation and reflective means is adjustable for selectively varying the phase of said reflected second mode.

7. A dual-mode array of radiating main guides comprising a common aperture for a frequency-scanned mode and a phase-scanned mode of operation, said modes being substantially mutually independent, each main guide including a forward section having a rectangular cross section and a first directional coupler for propagating a preselectively polarized first mode between a forward port of said forward section and said first coupler, an aft section having a square cross section and a second directional coupler for propagating a preselectively polarized second mode between an aft port of said aft section and said second coupler, and a transition section intermediate said forward and aft sections;

said array further comprising selectively phase-adjustable means for reflection of said second mode and rotation of the polarization thereof.

8. The device of claim 7 in which said selectively phase-adjustable reflective means comprises a mechanically scannable, polarization-rotating reflector mounted aft of said aft ports of said main guides.

9. The device of claim 7 in which said selectively phase adjustable means includes a polarization-rotating reflector mounted aft of said aft ports of said main guides, and electronic phase shift means mounted in said aft sections of said main guides.

\* \* \* \* \*